(12) United States Patent
Tanaka et al.

(10) Patent No.: US 10,259,669 B2
(45) Date of Patent: Apr. 16, 2019

(54) SHEET PRODUCT SUPPLYING APPARATUS

(71) Applicant: Totani Corporation, Kyoto (JP)

(72) Inventors: Kohei Tanaka, Kyoto (JP); Shintaro Kai, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 15/752,676

(22) PCT Filed: Sep. 7, 2016

(86) PCT No.: PCT/JP2016/076325
§ 371 (c)(1),
(2) Date: Feb. 14, 2018

(87) PCT Pub. No.: WO2017/061225
PCT Pub. Date: Apr. 13, 2017

(65) Prior Publication Data
US 2018/0362275 A1 Dec. 20, 2018

(30) Foreign Application Priority Data
Oct. 9, 2015 (JP) .................. 2015-201370

(51) Int. Cl.
B65H 3/04 (2006.01)
B65H 7/02 (2006.01)
B65B 43/14 (2006.01)
B65H 5/02 (2006.01)
B65H 1/22 (2006.01)
B65H 1/24 (2006.01)

(52) U.S. Cl.
CPC ............. *B65H 3/047* (2013.01); *B65B 43/14* (2013.01); *B65H 1/22* (2013.01); *B65H 1/24* (2013.01); *B65H 3/04* (2013.01); *B65H 5/021* (2013.01); *B65H 7/02* (2013.01)

(58) Field of Classification Search
CPC . B65H 3/047; B65H 7/02; B65H 1/22; B65H 1/24; B65H 5/021; B65B 43/14
See application file for complete search history.

(56) References Cited

U.S. PATENT DOCUMENTS

| 4,221,376 A * | 9/1980 | Handen | B65H 7/02 221/14 |
|---|---|---|---|
| 4,772,004 A | 9/1988 | Golicz | |

(Continued)

FOREIGN PATENT DOCUMENTS

| JP | S56-012240 | 2/1981 |
|---|---|---|
| JP | S58-028166 | 6/1983 |

(Continued)

OTHER PUBLICATIONS

International Search Report dated Nov. 29, 2016 in corresponding International patent application No. PCT/JP2016/076325.

*Primary Examiner* — Patrick Cicchino
(74) *Attorney, Agent, or Firm* — Kirschstein, Israel, Schiffmiller & Pieroni, P.C.

(57) ABSTRACT

A first sheet product 1 is gripped between an additional conveyor 2 and a feeding conveyor 3 at a downstream end of the additional conveyor 2. Subsequently, subsequent sheet products 1 are moved back by the feeding conveyor 3 to be separated from the first sheet product 1. Subsequently, the first sheet product 1 is supplied by the additional conveyor 2.

7 Claims, 3 Drawing Sheets

(56) References Cited

U.S. PATENT DOCUMENTS

| | | | | |
|---|---|---|---|---|
| 4,909,499 | A * | 3/1990 | O'Brien | B65H 3/5292 |
| | | | | 271/10.06 |
| 5,062,600 | A * | 11/1991 | Holbrook | B65H 3/042 |
| | | | | 271/273 |
| 5,971,389 | A * | 10/1999 | Golicz | B65H 3/02 |
| | | | | 271/122 |
| 6,461,102 | B2 * | 10/2002 | Sting | B65H 1/22 |
| | | | | 271/110 |
| 7,192,025 | B1 * | 3/2007 | Golicz | B65H 1/22 |
| | | | | 271/34 |
| 8,122,692 | B2 * | 2/2012 | Inoue | B65B 43/14 |
| | | | | 53/492 |
| 2011/0227275 | A1 * | 9/2011 | Poh | B65H 3/047 |
| | | | | 271/18.1 |

FOREIGN PATENT DOCUMENTS

| | | |
|---|---|---|
| JP | H05-000608 | 1/1993 |
| JP | H05-051016 | 3/1993 |
| JP | H10-323920 | 12/1998 |
| JP | 2003-002307 | 1/2003 |

* cited by examiner

SHEET PRODUCT SUPPLYING APPARATUS

TECHNICAL FIELD

The present invention relates to a sheet product supplying apparatus for supplying a plurality of sheet products one by one.

BACKGROUND ART

For example, in the apparatus disclosed in Patent Literature 1, a plurality of sheet products is supplied one by one at a supplying position. The sheet products comprise plastic bags. The supplied plastic bag is fed to a corner-cut position and an opening position so that the plastic bag is corner-cut by a cutting blade and opened by an opening device. Subsequently, the plastic bag is fed to a heat-seal device, an accessory is inserted in the plastic bag, and the plastic bag and the accessory are heat-sealed by the heat-seal device.

In this case, it is necessary to first supply a plurality of the sheet products one by one. Some apparatuses which achieve this have been proposed. For example, in the apparatus disclosed in Patent Literature 2, sheet products are stacked with each other and fed by a feeding belt. The sheet products comprise wrappers. Further, an additional belt is disposed on upper side of the feeding belt, pressed against an uppermost wrapper, and driven at the speed higher than the feeding belt. The uppermost wrapper is moved forward in advance due to the speed difference to be separated from the subsequent wrappers. Therefore, the wrappers are supplied one by one. In this respect, the same is true of the apparatus disclosed in Patent Literature 3.

The reason why the uppermost wrapper is moved forward in advance due to the speed difference is friction force. The friction force is generated between the additional belt and the uppermost wrapper, and it is higher than friction force between the uppermost wrapper and the next wrapper. When there is the speed difference, the uppermost wrapper is moved forward in advance due to the difference between the friction forces.

However, the friction force is different depending on the material of the wrapper and can also be changed by other factors. The uppermost wrapper is not always moved forward in advance due to the difference between the friction forces. Sometimes, the uppermost wrapper is not separated from the next wrapper, and as a result the both are supplied at the same time.

Therefore, an object of the present invention is to provide a sheet product supplying apparatus for supplying a plurality of sheet products one by one, wherein the sheet products are prevented from being supplied at the same time.

CITATION LIST

Patent Literatures

[Patent Literature 1] Japanese Patent No. 3920441
[Patent Literature 2] Japanese Patent No. S58-28166
[Patent Literature 3] Japanese Utility Model Laid-Open No. H5-608

SUMMARY OF THE INVENTION

According to the present invention, an additional conveyor is disposed on upper side of a feeding conveyor by which sheet products are fed. The sheet products stacked with each other in a shifted state are fed. The additional conveyor extends in a feeding direction of the sheet products. Further, a front end of a first sheet product is detected by a sensor when the first sheet product reaches or exceeds an downstream end of the additional conveyor. Further, a control device is connected to the feeding conveyor, the additional conveyor and the sensor. The feeding conveyor and the additional conveyor are controlled by the control device based on detection signal from the sensor. As a series of operations, the feeding conveyor is stopped by the control device in response to the sensor detecting the front end of the first sheet product so that the first sheet product is gripped between the feeding conveyor and the additional conveyor at a downstream end of the additional conveyor. Subsequently, the feeding conveyor is reversed by the control device so that subsequent sheet products are moved back by the feeding conveyor to be separated from the first sheet product. Subsequently, the additional conveyor is driven by the control device so that the first sheet product is supplied by the additional conveyor. Subsequently, the feeding conveyor is driven by the control device so that the subsequent sheet products are fed by the feeding conveyor.

In a preferred embodiment, when the sheet products are fed by the feeding conveyor, the feeding conveyor and the additional conveyor are driven by the control device so that the sheet products are fed by the feeding conveyor and the additional conveyor. Further, the feeding conveyor and the additional conveyor are stopped by the control device based on the detection signal from the sensor. Further, after supply of the first sheet product, the feeding conveyor and the additional conveyor are driven by the control device so that the subsequent sheet products are fed by the feeding conveyor and the additional conveyor.

Further, the additional conveyor and the feeding conveyor are disposed with a space at the downstream end of the additional conveyor, and the space corresponds to a thickness of the sheet product.

The feeding conveyor and the additional conveyor have downstream ends, respectively. Further, the downstream ends are formed at positions corresponding to each other so that the first sheet product is gripped between the additional conveyor and the feeding conveyor at the downstream ends.

The feeding conveyor and the additional conveyor have belts and rollers, respectively. Further, the belts are engaged with the rollers corresponding thereto, and the belt of the additional conveyor is opposed to the roller of the feeding conveyor at the downstream ends of the feeding conveyor and the additional conveyor so that the first sheet product is gripped between the belt of the additional conveyor and the roller of the feeding conveyor.

Further, a Teflon (trademark) sheet is disposed on upper side of the roller of the feeding conveyor at a position where the first sheet product is gripped. The first sheet product is directed to upper side of the Teflon (trademark) sheet. The belt of the additional conveyor is pressed against the first sheet product and the Teflon (trademark) sheet when the first sheet product is gripped. The roller of the feeding conveyor is slipped to the Teflon (trademark) sheet when the feeding conveyor is reversed (FIGS. 4A and 4B).

A one-way clutch or bearing is built in the roller of the feeding conveyor at the position where the first sheet product is gripped. The roller of the feeding conveyor is supported by the one-way clutch or bearing. The roller of the feeding conveyor may be prevented by the one-way clutch or bearing from being rotated when the feeding conveyor is reversed (FIG. 4C).

According to the present invention, the first sheet product is fed in a state of being sandwiched between the feeding conveyor and the additional conveyor, and detected by the sensor the moment the front end of the first sheet product protrudes downstream from between the feeding conveyor and the additional conveyor. The downstream end of the additional conveyor means the center of the downstream roller of the additional conveyor. The first sheet product is detected by the sensor the moment the front end of the first sheet product protrudes downstream from between the feeding conveyor and the additional conveyor.

MODE FOR CARRYING OUT THE INVENTION

Figure 1A:
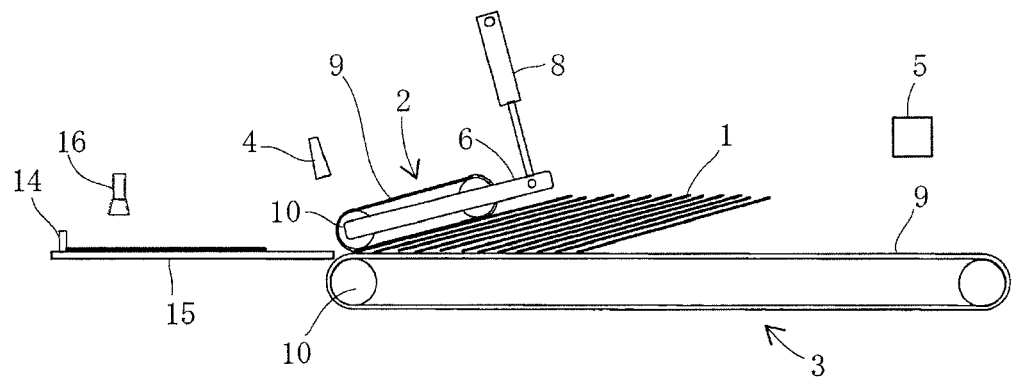
FIG. 1A is a side view illustrating an embodiment of the present invention.

Hereinafter, embodiments of the present invention will be described below.

FIG. 1 shows a sheet product supplying apparatus according to an embodiment of the present invention. The apparatus is an auxiliary equipment of the apparatus disclosed in Patent Literature 1. A plurality of sheet products is supplied one by one. The sheet products comprise plastic bags 1.

In the apparatus, an additional conveyor 2 is disposed on upper side of a feeding conveyor 3, and the plastic bags 1 are fed by the feeding conveyor 3. The plastic bags 1 are stacked with each other in an inclined and shifted state and fed. For example, on the feeding conveyor 3, the plastic bags 1 are manually operated so that the plastic bags 1 are stacked with each other in the shifted state. And the plastic bags 1 are fed in that state. The additional conveyor 2 extends a feeding direction of the plastic bags 1.

The plastic bags 1 manually stacked with each other in the obliquely shifted state and placed on upstream side of the feeding conveyor 3 are fed downstream by the feeding conveyor 3. However, since the plastic bags 1 are manually placed, the shifts of the plastic bags 1 from each other are not same but uneven to some extent. Therefore, an air cylinder 8 shown in FIG. 1A repeatedly expands and contracts according to the predetermined time ratio during the feed. Thereby, a lever 6 is swung to tap the plastic bags 1 at the predetermined time interval, and as a result the shifts of the plastic bags 1 are equalized.

Subsequently, the plastic bags 1 further fed downstream by the feeding conveyor 3 arrives at a position (a downstream end of the additional conveyor 2) where the front ends of the plastic bags 1 are gripped by the feeding conveyor 3 and the additional conveyor 2.

The moment the front end of the first plastic bag 1 protrudes downstream from between the additional conveyor 2 and the feeding conveyor 3, the first plastic bag 1 is detected by a sensor 4. Specifically, the feeding conveyor 3 is driven in the feeding direction when the sensor 4 is in the state of not detecting the plastic bag 1. At this time, the additional conveyor 2 is also driven in the feeding direction at the same speed as the feeding conveyor 3. And the moment the front end of the plastic bag 1 protrudes in the feeding direction from between the additional conveyor 2 and the feeding conveyor 3, the front end of the plastic bag 1 is detected by the sensor 4. The sensor 4 comprises a non-contact type sensor such as an optical sensor.

When the front end of the plastic bag 1 is detected by the sensor 4, the air cylinder 8 which has repeatedly expanded and contracted until then is kept expanding, and thereby the plastic bags 1 are pressed from above by belts 9 of the additional conveyor 2. As a result, grip force between the uppermost (first) plastic bag 1 and the belts 9 of the additional conveyor 2 is increased.

A control device 5 is connected to the feeding conveyor 3, the additional conveyor 2 and the sensor 4. The feeding conveyor 3 and the additional conveyor 2 are controlled by the control device 5 based on detection signal from the sensor 4. The control device 5 comprises a computer such as a PLC (programmable logic controller).

Figure 1B:
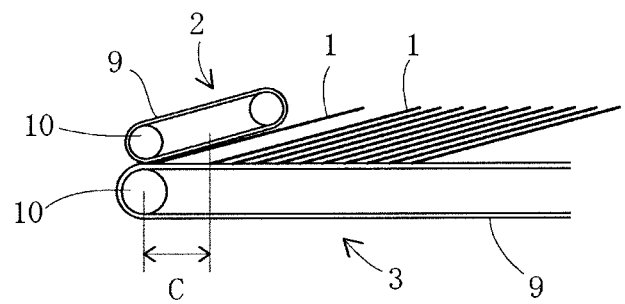
FIG. 1B is a side view illustrating that subsequent sheet products of FIG. 1A have been moved back.
Figure 4A:
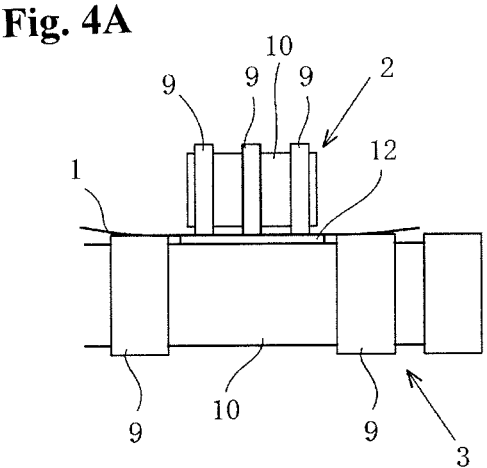
FIG. 4A is a front view of a feeding conveyor and the additional conveyor of FIG. 1.

When the front end of the plastic bag 1 is detected by the sensor 4, the feeding conveyor 3 is stopped by the control device 5 so that the first plastic bag 1 is gripped between the additional conveyor 2 and the feeding conveyor 3 at the downstream end of the additional conveyor 2 (FIG. 1A). In more detail, as shown in FIG. 4A, the plastic bag 1 is sandwiched between the belts 9 of the additional conveyor 2 and a Teflon (trademark) sheet 12. Subsequently, the feeding conveyor 3 is reversed by the control device 5 for the predetermined time. Since the grip force between the first plastic bag 1 and the belts 9 of the additional conveyor 2 is increased as described above, the subsequent plastic bags 1 are moved back by the feeding conveyor 3 without the uppermost plastic bag 1 being moved back, and thereby the subsequent plastic bags 1 are separated from the first plastic bag 1 (FIG. 1B). The space C is about 1 cm. If the first plastic bag 1 is moved back together with the subsequent plastic bags 1, the sensor 4 does not detect the front end of the first plastic bag 1. Therefore, the feeding conveyor 3 and the additional conveyor 2 are again driven in the feeding direction by the control device 5 so that the plastic bags 1 are fed until the front end of the plastic bag 1 is detected by the sensor 4.

The feeding conveyor 3 repeats the cycle in which it is stopped after being reversed tier the predetermined time. And during this, the additional conveyor 2 keeps driven in the feeding direction gripping the first plastic bag 1 to discharge the first plastic bag 1 downstream.

While the subsequent plastic bags 1 are moved hack to be separated from the first plastic bag 1, the additional conveyor 2 is driven in the feeding direction by the control device 5 so that the first plastic bag 1 is discharged by the additional conveyor 2 on a tray 15 disposed downstream of the additional conveyor 2, stopped by a stopper 14, sucked by a vacuum pad 16, and then fed to the next process.

The sensor 4 does not detect the plastic bag 1 when the plastic bag 1 has been discharged on the tray 15. Therefore, the feeding conveyor 3 and the additional conveyor 2 are driven in the feeding direction at the same speed so that the subsequent plastic bags 1 are fed.

Regarding the subsequent plastic bags 1, similarly, the feeding conveyor 3 and the feeding conveyor 2 are temporally stopped when the front end of the sheet product 1 is detected by the sensor 4. Subsequently, the additional conveyor 2 keeps driven in the feeding direction to discharge the plastic bag 1, while the feeding conveyor 3 is repeatedly reversed and stopped in the predetermined time cycle. Afterward, the same operations are repeated.

Figure 2:
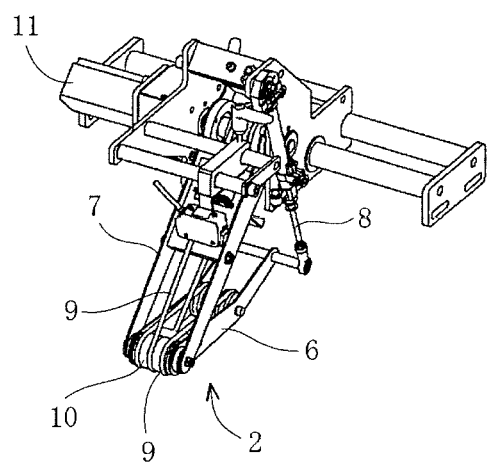
FIG. 2 is a perspective view of an additional conveyor of FIG. 1.
Figure 3:
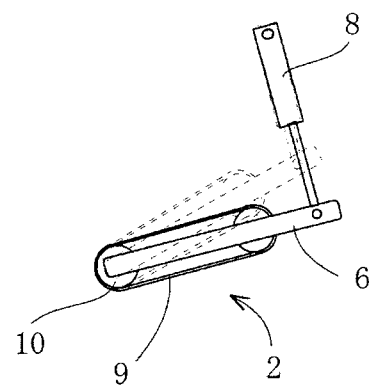
FIG. 3 is a side view of the additional conveyor of FIG. 1.

In this embodiment, as shown in FIG. 2, the additional conveyor 2 is attached to the lever 6 and supported by an arm 7. The lever 6 is connected to the air cylinder 8. The additional conveyor 2 is engaged with the first plastic bag 1 when the plastic bags 1 are fed by the feeding conveyor 3 so that the plastic bags 1 are positioned between the additional conveyor 2 and the feeding conveyor 3.

Further, in this embodiment, not only the feeding conveyor 3 but also the additional conveyor 2 is driven by the control device 5 when the plastic bags 1 are fed by the feeding conveyor 3 so that the plastic bags 1 are fed h the feeding conveyor 3 and the additional conveyor 2. Further, not only the feeding conveyor 3 but also the additional conveyor 2 is stopped by the control device 5 based on the detection signal from the sensor 4. Further, after the supply of the first plastic bag 1, not only the feeding conveyor 3 but also the additional conveyor 2 is driven by the control device 5 so that the subsequent plastic bags 1 are fed by the feeding conveyor 3 and the additional conveyor 2.

It is possible to equalize the shifts of the plastic bags 1, increase the grip force between the belts 9 of the additional conveyor 2 and the plastic bag 1, and feed the plastic bags 1 smoothly one by one by moving the lever 6 upward and downward with the air cylinder 8 to swing the lever 6 and the additional conveyor 2 relative to the arm 7 (FIG. 2) when the plastic bags 1 are fed.

Further, the additional conveyor 2 is supported by the arm 7, the additional conveyor 2 and the feeding conveyer 3 are disposed with a space at the downstream end of the additional conveyor 2, and the space corresponds to the thickness of the first plastic bag 1. Therefore, the first plastic bag 1 is directed to and pressed into between the additional conveyor 2 and the feeding conveyor 3 when the sheet products 1 are fed. The first plastic bag 1 is gripped between the additional conveyor 2 and the feeding conveyor 3 when the feeding conveyor 3 and the additional conveyor 2 are stopped.

In this embodiment, the feeding conveyor 3 and the feeding conveyor 2 have downstream ends, respectively. Further, the downstream ends are formed at positions corresponding to each other so that the first plastic bag 1 is gripped between the additional conveyor 2 and the feeding conveyor 3 at the downstream ends.

Figure 4B:
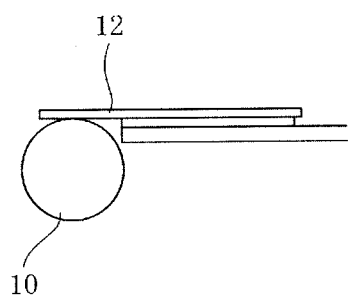
FIG. 4B is a side view of the feeding conveyor of FIG. 4A.

The feeding conveyor 3 and the additional conveyor 2 have belts 9 and roller 10, respectively. Further, the belts 9 are engaged with the rollers 10 corresponding thereto, and as shown in FIG. 4, the belts 9 of the additional conveyor 2 are opposed to the roller 10 of the feeding conveyor 3 at the downstream ends of the feeding conveyor 3 and the additional conveyor 2 so that the first plastic bag 1 is gripped between the belts 9 of the additional conveyor 2 and the roller 10 of the feeding conveyor 3.

As shown in FIG. 2, one belt 9 among the belts 9 of the additional conveyor 2 may be coupled to a motor 11, the control device 5 may be connected to the motor 11, and the additional conveyor 2 may be driven by the motor 11.

Further, in this embodiment, the Teflon (trademark) sheet 12 is disposed on upper side of the roller 10 of the feeding conveyor 3 at the position where the first plastic bag 1 is gripped. The plastic bag 1 is directed to upper side of the Teflon (trademark) sheet 12 (FIG. 4A). The belts 9 of the additional conveyor 2 are pressed against the first plastic bag 1 and the Teflon (trademark) sheet 12 when the first plastic bag 1 is gripped. The roller 10 of the feeding conveyor 3 is slipped to the Teflon (trademark) sheet 12 when the feeding conveyor 3 is reversed. Therefore, the first plastic bag 1 is prevented from being moved back when the feeding conveyor 3 is reversed to move the subsequent plastic bags 1 back.

Figure 4C:
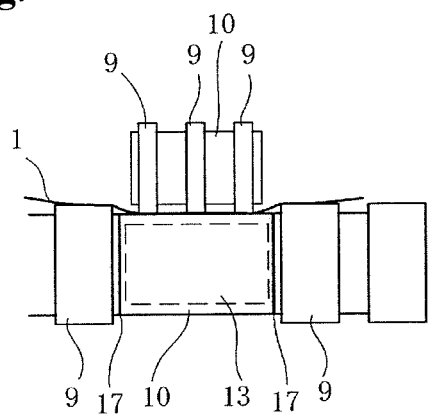
FIG. 4C is a front view illustrating another embodiment.

A one-way clutch or bearing 13 may be built in the roller 10 of the feeding conveyor 3 at the position where the first plastic bag 1 is gripped, and the roller 10 of the feeding conveyor 3 may be supported by the one-way clutch or bearing 13 (FIG. 4C). In this case, the roller 10 of the feeding conveyor 3 may be prevented by the one-way clutch or bearing 13 from being rotated when the feeding conveyor 3 is reversed. For example, as shown in FIG. 4C, the roller 10 of the feeding conveyor 3 is divided by the divisional lines 17 in the axial direction thereof, and the one-way clutch or bearing 13 is built in the central portion having the divisional lines 17 as opposite ends. In this structure, when the first plastic bag 1 is gripped, the belts 9 are reversed along with the reverse of the feeding conveyor 3, however the roller 10 of the feeding conveyor 3 at the position opposite to the additional conveyor 2 is prevented from being rotated.

After the first plastic bag 1 is fed in this way, the subsequent plastic bags 1 are fed by the feeding conveyor 3 and the additional conveyor 2. The plastic bags 1 are gripped between the feeding conveyor 3 and the additional conveyor 2 at the downstream ends of the feeding conveyor 3 and the additional conveyor 2. Subsequently, the same steps are repeated sequentially and alternately.

In the apparatus, it is important that after the grip of the first plastic bag 1 the subsequent plastic bags 1 are moved hack by the feeding conveyor 3 to be separated from the first plastic bag 1. Subsequently, the first sheet product 1 separated is supplied. Therefore, it is possible to supply the plastic bags 1 one by one. The first plastic bag 1 and the subsequent plastic bags 1 are prevented from being supplied at the same time.

The sheet products can be supplied by the apparatus when other sheet products than the plastic bags 1 are supplied.

EXPLANATION OF REFERENCES 1 plastic bag
2 additional conveyor
3 feeding conveyor
4 sensor
5 control device
9 belt
10 roller
12 Teflon (trademark) sheet
13 one-way clutch or bearing

The invention claimed is:

1. A sheet product supplying apparatus for supplying a plurality of sheet products one by one, the apparatus comprising:
  a feeding conveyor by which the sheet products stacked with each other in a shifted state are fed;
  an additional conveyor disposed on upper side of the feeding conveyor and extending in a feeding direction of the sheet products;
  a sensor by which a front end of the sheet product is detected; and
  a control device connected to the feeding conveyor, the additional conveyor and the sensor to control the feeding conveyor and the additional conveyor based on detection signal from the sensor, the feeding conveyor being stopped by the control device so that a first sheet product is gripped between the additional conveyor and the feeding conveyor at a downstream end of the additional conveyor, the feeding conveyor being subsequently reversed by the control device so that subsequent sheet products are moved back by the feeding conveyor to be separated from the first sheet product, the additional conveyor being subsequently driven by the control device so that the first sheet product is supplied by and downstream of the additional conveyor, the feeding conveyor being subsequently driven by the control device so that the subsequent sheet products are fed by the feeding conveyor.

2. The sheet product supplying apparatus according to claim 1, wherein the feeding conveyor and the additional conveyor are driven by the control device when the sheet products are fed by the feeding conveyor so that the sheet products are fed by the feeding conveyor and the additional conveyor, wherein the feeding conveyor and the additional conveyor are stopped by the control device based on the detection signal from the sensor, and wherein the feeding conveyor and the additional conveyor are driven by the control device after the supply of the first sheet product so that the subsequent sheet products are fed by the feeding conveyor and the additional conveyor.

3. The sheet product supplying apparatus according to claim 1, wherein the additional conveyor and the feeding conveyor are disposed with a space at the downstream end of the additional conveyor, the space corresponding to a thickness of the sheet product.

4. The sheet product supplying apparatus according to claim 1, wherein the feeding conveyor and the additional conveyor have downstream ends, respectively, the downstream ends being formed at positions corresponding to each other so that the first sheet product is gripped between the additional conveyor and the feeding conveyor at the downstream ends.

5. The sheet product supplying apparatus according to claim 4, wherein the feeding conveyor and the additional conveyor have belts and rollers, respectively, the belts being engaged with the rollers corresponding thereto, the belt of the additional conveyor being opposed to the roller of the feeding conveyor at the downstream ends of the feeding conveyor and the additional conveyor so that the first sheet product is gripped between the belt of the additional conveyor and the roller of the feeding conveyor.

6. The sheet product supplying apparatus according to claim 5, wherein a polytetrafluoroethylene sheet is disposed on upper side of the roller of the feeding conveyor at a position where the first sheet product is gripped, the first sheet product being directed to upper side of the polytetrafluoroethylene sheet, wherein the belt of the additional conveyor is pressed against the first sheet product and the polytetrafluoroethylene sheet when the first sheet product is gripped, and wherein the roller of the feeding conveyor is slipped to the polytetrafluoroethylene sheet when the feeding conveyor is reversed.

7. The sheet product supplying apparatus according to claim 5, wherein a one-way clutch or bearing is built in the roller of the feeding conveyor at a position where the first sheet product is gripped, the roller of the feeding conveyor being supported by the one-way clutch or bearing, the roller of the feeding conveyor being prevented by the one-way clutch or bearing from being rotated when the feeding conveyor is reversed.

\* \* \* \* \*